United States Patent
Stec et al.

(10) Patent No.: US 8,294,748 B2
(45) Date of Patent: Oct. 23, 2012

(54) PANORAMA IMAGING USING A BLENDING MAP

(75) Inventors: Piotr Stec, Galway (IE); Larry Murray, Galway (IE); Alexandru Drimbarean, Galway (IE); Igor Barcovschi, Galway (IE); Peter Corcoran, Claregalway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 441 days.

(21) Appl. No.: 12/636,618

(22) Filed: Dec. 11, 2009

(65) Prior Publication Data

US 2011/0141300 A1    Jun. 16, 2011

(51) Int. Cl.
H04N 7/00 (2006.01)
H04N 5/225 (2006.01)
H04N 5/262 (2006.01)
G06K 9/36 (2006.01)

(52) U.S. Cl. .................. 348/36; 348/219.1; 348/218.1; 348/239; 382/284

(58) Field of Classification Search .................. 348/239, 348/218.1, 219.1, 36, 37, 222.1; 382/284, 382/294
See application file for complete search history.

(56) References Cited

U.S. PATENT DOCUMENTS

| | | | |
|---|---|---|---|
| 4,970,663 A | 11/1990 | Bedell et al. | |
| 5,384,615 A | 1/1995 | Hsieh et al. | |
| 5,982,951 A | 11/1999 | Katayama et al. | |
| 6,094,215 A | 7/2000 | Sundahl et al. | |
| 6,657,667 B1 * | 12/2003 | Anderson | 348/36 |
| 6,714,249 B2 * | 3/2004 | May et al. | 348/36 |
| 7,110,569 B2 | 9/2006 | Brodsky et al. | |
| 7,315,631 B1 | 1/2008 | Corcoran et al. | |
| 7,400,782 B2 | 7/2008 | Zhou et al. | |
| 7,403,643 B2 | 7/2008 | Ianculescu et al. | |
| 7,409,105 B2 | 8/2008 | Jin et al. | |
| 7,424,218 B2 * | 9/2008 | Baudisch et al. | 348/218.1 |
| 7,440,593 B1 | 10/2008 | Steinberg et al. | |
| 7,460,694 B2 | 12/2008 | Corcoran et al. | |
| 7,460,695 B2 | 12/2008 | Steinberg et al. | |
| 7,469,055 B2 | 12/2008 | Corcoran et al. | |
| 7,469,071 B2 | 12/2008 | Drimbarean et al. | |

(Continued)

FOREIGN PATENT DOCUMENTS

GB   2405764 A   3/2005

(Continued)

OTHER PUBLICATIONS

PCT Notification of Transmittal of the International Search Report and the Written Opinion of the International Searching Authority, or the Declaration, for PCT Application No. PCT/EP2010/064107, report dated Dec. 29, 2010, 8 pages.

(Continued)

Primary Examiner — Nhan T Tran
(74) Attorney, Agent, or Firm — Andrew V. Smith

(57) ABSTRACT

A technique of generating a panoramic image involves acquiring a set of at least two main image frames, as well as corresponding generating and/or acquiring corresponding relatively low-resolution image frames, of overlapping portions of a panoramic scene. A map or other information is stored relating to the generation of a low-res panorama. A main panorama image is formed by joining main image frames based on the map or other information gained in the low-res process.

24 Claims, 7 Drawing Sheets
(3 of 7 Drawing Sheet(s) Filed in Color)

U.S. PATENT DOCUMENTS

| | | | |
|---|---|---|---|
| 7,474,848 B2* | 1/2009 | Gennetten et al. | 348/362 |
| 7,565,030 B2 | 7/2009 | Steinberg et al. | |
| 7,606,417 B2 | 10/2009 | Steinberg et al. | |
| 7,746,404 B2* | 6/2010 | Deng et al. | 348/36 |
| 7,916,897 B2 | 3/2011 | Corcoran et al. | |
| 8,068,693 B2* | 11/2011 | Sorek et al. | 382/284 |
| 2001/0038413 A1 | 11/2001 | Peleg et al. | |
| 2002/0063709 A1 | 5/2002 | Gilbert et al. | |
| 2003/0107586 A1 | 6/2003 | Takiguchi et al. | |
| 2003/0123751 A1 | 7/2003 | Krishnamurthy et al. | |
| 2003/0142209 A1 | 7/2003 | Yamazaki et al. | |
| 2004/0130626 A1 | 7/2004 | Ouchi et al. | |
| 2004/0189849 A1 | 9/2004 | Hofer | |
| 2004/0218246 A1 | 11/2004 | Onuki et al. | |
| 2005/0008254 A1 | 1/2005 | Ouchi et al. | |
| 2005/0063610 A1* | 3/2005 | Wu et al. | 382/260 |
| 2005/0200706 A1 | 9/2005 | Ouchi | |
| 2006/0018547 A1 | 1/2006 | Ouchi | |
| 2006/0039690 A1 | 2/2006 | Steinberg et al. | |
| 2006/0062487 A1 | 3/2006 | Ouchi | |
| 2006/0171464 A1 | 8/2006 | Ha | |
| 2006/0182437 A1* | 8/2006 | Williams et al. | 348/218.1 |
| 2006/0268130 A1 | 11/2006 | Williams et al. | |
| 2006/0285754 A1 | 12/2006 | Steinberg et al. | |
| 2007/0014347 A1 | 1/2007 | Prechtl et al. | |
| 2007/0019003 A1 | 1/2007 | Imai et al. | |
| 2007/0081081 A1 | 4/2007 | Cheng | |
| 2007/0147820 A1 | 6/2007 | Steinberg et al. | |
| 2007/0269108 A1 | 11/2007 | Steinberg et al. | |
| 2008/0013798 A1 | 1/2008 | Ionita et al. | |
| 2008/0037827 A1 | 2/2008 | Corcoran et al. | |
| 2008/0037838 A1 | 2/2008 | Ianculescu et al. | |
| 2008/0037839 A1 | 2/2008 | Corcoran et al. | |
| 2008/0037840 A1 | 2/2008 | Steinberg et al. | |
| 2008/0089405 A1 | 4/2008 | Cho et al. | |
| 2008/0106593 A1 | 5/2008 | Arfvidsson et al. | |
| 2008/0115066 A1 | 5/2008 | Pavley et al. | |
| 2008/0118183 A1 | 5/2008 | Teo | |
| 2008/0152258 A1 | 6/2008 | Tulkki | |
| 2008/0170803 A1* | 7/2008 | Forutanpour | 382/284 |
| 2008/0175481 A1 | 7/2008 | Petrescu et al. | |
| 2008/0205712 A1 | 8/2008 | Ionita et al. | |
| 2008/0219517 A1 | 9/2008 | Blonk et al. | |
| 2008/0219581 A1 | 9/2008 | Albu et al. | |
| 2008/0219587 A1 | 9/2008 | Avidan et al. | |
| 2008/0266419 A1 | 10/2008 | Drimbarean et al. | |
| 2008/0292193 A1 | 11/2008 | Bigioi et al. | |
| 2008/0309769 A1 | 12/2008 | Albu et al. | |
| 2009/0003652 A1 | 1/2009 | Steinberg et al. | |
| 2009/0021576 A1 | 1/2009 | Linder et al. | |
| 2009/0022422 A1 | 1/2009 | Sorek et al. | |
| 2009/0040342 A1 | 2/2009 | Drimbarean et al. | |
| 2009/0080713 A1 | 3/2009 | Bigioi et al. | |
| 2009/0086021 A1 | 4/2009 | Baier et al. | |
| 2009/0179998 A1 | 7/2009 | Steinberg et al. | |
| 2009/0185753 A1 | 7/2009 | Albu et al. | |
| 2009/0190803 A1 | 7/2009 | Neghina et al. | |
| 2009/0196466 A1 | 8/2009 | Capata et al. | |
| 2009/0244296 A1 | 10/2009 | Petrescu et al. | |
| 2009/0263022 A1 | 10/2009 | Petrescu et al. | |
| 2009/0273685 A1 | 11/2009 | Ciuc et al. | |
| 2009/0303343 A1 | 12/2009 | Drimbarean et al. | |
| 2010/0026831 A1 | 2/2010 | Ciuc et al. | |
| 2010/0026832 A1 | 2/2010 | Ciuc et al. | |
| 2010/0026833 A1 | 2/2010 | Ciuc et al. | |
| 2010/0033553 A1 | 2/2010 | Levy | |
| 2010/0188560 A1 | 7/2010 | Sakai et al. | |
| 2010/0201870 A1 | 8/2010 | Luessi et al. | |
| 2010/0265313 A1* | 10/2010 | Liu et al. | 348/36 |
| 2010/0272363 A1 | 10/2010 | Steinberg et al. | |
| 2011/0007174 A1 | 1/2011 | Bacivarov et al. | |
| 2011/0081052 A1 | 4/2011 | Bigioi et al. | |
| 2011/0102553 A1 | 5/2011 | Corcoran et al. | |
| 2011/0141225 A1 | 6/2011 | Stec et al. | |
| 2011/0141226 A1 | 6/2011 | Stec et al. | |
| 2011/0141227 A1 | 6/2011 | Bigioi et al. | |
| 2011/0141229 A1 | 6/2011 | Stec et al. | |
| 2011/0141300 A1 | 6/2011 | Stec et al. | |
| 2012/0019613 A1 | 1/2012 | Murray et al. | |
| 2012/0019614 A1 | 1/2012 | Murray et al. | |

FOREIGN PATENT DOCUMENTS

| | | | |
|---|---|---|---|
| JP | 2005-328497 A | 11/2005 | |
| WO | 2007/142621 A1 | 12/2007 | |
| WO | 2008/017343 A1 | 2/2008 | |
| WO | 2011/069698 A1 | 6/2011 | |
| WO | 2012/032412 A2 | 3/2012 | |

OTHER PUBLICATIONS

Invitation to Pay Additional Fees and, Where Applicable, Protest Fee (PCT Article 17(3)(a) and Rule 40.1 and 40.2(e)), including Annex to Form PCT/ISA/206, Communication Relating to the Results of the Partial International Search, for PCT Application No. PCT/IB2011/002715, report dated Mar. 27, 2012, 4 Pages.

PCT Notification of the Transmittal of the International Search Report and the Written Opinion of the International Search Authority, or the Declaration, for PCT Application No. PCT/EP2011/071233, report dated Mar. 2, 2012, 9 Pages.

Richard Szeliski, "Image Alignment and Stitching: A Tutorial", Technical Report MSR-TR-2004-92, Microsoft Research, Jan. 26, 2005, pp. 1-71.

J.A. Sethian: A Fast Marching Level Set Method for Monotonically Advancing Fronts, Proceedings from the National Academy of Sciences, submitted for publication on Oct. 20, 1995, pp. 1-17.

Moshe Sniedovich, (2006). "Dijkstra's algorithm revisited: the dynamic programming connexion". Journal of Control and Cybernetics, vol. 35, No. 3. pp. 599-620, http://matwbn.icm.edu.pl/ksiazki/cc/cc35/cc3536.pdf.

Dijkstra, E. W. (1959). "A note on two problems in connexion with graphs". Numerische Mathematik 1: 269-271, http://www-m3.ma.turn.de/twiki/pub/MN0506/WebHome/dijkstra.pdf.

Zhigang Zhu, Edward M. Riscman, Allen R. Hanson: Parallel-perspective stereo mosaics, Proceedings of the Eight IEEE International Conference on Computer Vision. (ICCV). Vancouver, British Columbia, Canada, Jul. 7-14, 2001; [International Conference on Computer Vision], Los Alamitos, CA: IEEE Comp Soc., US, vol. 1, Jul. 7, 2001 pp. 345-352, XP010554003, ISBN: 978-0-7695-1143-6.

Georges Lagarde: "correcting wider than 90° rectilinear images to print or to display architecture panoramas (to remove the stretching near the sides, just squeeze your panos!)", retrieved on Mar. 4, 2010 from the Internet, URL: http://www.panorama-numerique.com/squeeze/squeeze.htm, 8 Pages.

Patent Abstracts of Japan, publication No. JP2005-328497A, published on Nov. 24, 2005, Image Pickup Apparatus and Image Pickup Method. 1 Page.

Co-pending U.S. Appl. No. 13/306,568, filed Nov. 29, 2011.

Non-Final Rejection, dated Jun. 4, 2012, for U.S. Appl. No. 12/636,639, filed Dec. 11, 2009.

\* cited by examiner

PANORAMA IMAGING USING A BLENDING MAP

RELATED APPLICATIONS

This application is one of a series of contemporaneously filed applications related to panorama imaging by the same inventors, including those entitled PANORAMA IMAGING USING LO-RES IMAGES (Ser. No. 12/636,608); PANORAMA IMAGING USING A BLENDING MAP (Ser. No. 12/636,618); PANORAMA IMAGING USING SUPER-RESOLUTION (Ser. No. 12/636,629); PANORAMA IMAGING BASED ON LOW-RES IMAGES (Ser. No. 12/636,639); and PANORAMA IMAGING BASED ON A LO-RES MAP (Ser. No. 12/636,647).

FIELD OF THE INVENTION

The invention relates to panoramic imaging with portable and/or handheld cameras, digital still cameras, and other camera-enabled devices such as camera-phones and other handheld devices, and processor-based portable devices with image acquisition capabilities.

BACKGROUND

A panoramic photograph is a photograph with an unusually large field of view, an exaggerated aspect ratio, or both. For example, a horizontal panoramic photograph may be much wider than it is tall, and may have a horizontal angle of view that is large in relation to its vertical angle of view. A vertical panoramic photograph may be much taller than it is wide, and may have a vertical angle of view that is large in relation to its horizontal angle of view.

A panoramic photograph or panoramic image, sometimes also called simply a "panorama", can provide a unique and sometimes striking view of a scene.

Panorama imaging involves taking a sequence of images of an extended horizontal scene and compositing these into a single extended image. This enables a "panoramic," typically outdoor, scene to be captured with a standard camera with a normal optical system of limited field-of-view.

An alternative approach is to capture a scene with a specialized optical lens known as a fish-eye which has an enhanced field of view of up to 170'. Such specialized lenses require expensive fabrication and precise machining of the elements of the lens. Implementing a panoramic imaging method in a digital camera enables similar results at a fraction of the cost.

Historically, panoramic photographs have been taken using specially-made cameras. One kind of panoramic camera uses a rotating lens and body to sweep across a large field of view, while moving film past a narrow exposure slit behind the lens. This kind of rotating camera, sometimes called a "Cirkut-type" camera after an early commercial model, can take a photograph with a field of view of 360 degrees or more. A swing-lens camera operates on a similar principle, but rotates its lens and the exposure slit in relation to a stationary body and film. A swing-lens camera can take a photograph with a field of view somewhat less than 180 degrees.

Another method of making a panoramic photograph may involve taking several overlapping standard or conventional photographs, each typically having an aspect ratio of about 3:2 or otherwise less than is desired in the panoramic photograph, and joining them together into a single larger photograph. The joining may be typically done using a computer operating on digital representations of the component photographs, for example photographs taken with a digital camera. The process of combining digital images into a larger photograph is often called "stitching" or "mosaicing". In principle, any number of component images can be stitched, and the resulting panorama can cover a field of view of up to 360 degrees or more.

Stitching can be computationally-intensive. For example, software performing image stitching may correct distortions, such as lens distortion and perspective distortion that may be present in component images before stitching them together. Additionally, finding the proper alignment and color or tonal balance between component images may involve multiple computations of correlation coefficients that reflect the "goodness" of the alignment between image segments. Variations in tone, caused by effects such as changes in viewing angle and lens vignetting, may be corrected or otherwise accommodated. The time required to perform the stitching increases dramatically with increased size or resolution of the component images.

Some modern digital cameras provide a mode that assists a user of the camera in taking a set of component photographs for later stitching into a panoramic photograph. For example, a panoramic mode may use a display screen on the camera to assist the user in framing each component photograph for proper overlap with a previous photograph in the set, and may ensure consistent exposure settings for all of the component photographs in a set.

At least one existing model of digital camera can perform stitching on a set of low-resolution "screen nail" images so that the photographer can detect certain problems such as insufficient overlap in the component images. A "screen nail" may include a small low-resolution copy of a digital image, analogous to a "thumbnail" image, and is sized to fit an on-camera display. A typical screen nail image may have, for example, approximately 320 by 240 pixels. This capability is described in U.S. patent application 20060182437 (Hewlett-Packard).

However, previous digital cameras have not performed the stitching of high or full-resolution images in real-time because the relatively simple processors used in digital cameras could not perform the computationally-intensive stitching algorithms quickly enough to provide a satisfactory user experience. Previously, a camera user who wished to stitch high-resolution component images into a panorama had to upload the component images to an external computer and use software executing on the computer to perform the stitching. This prior method involved the use of a computer, possibly including installing additional software on the computer, and prevented the user from immediately printing or sharing the panorama.

More recently a number of techniques of creating panoramic images directly on a digital camera, or in a handheld imaging device such as a camera-phone or smartphone have been described.

As examples, U.S. 20090022422 to Sorek et al. (Hewlett-Packard), describes a method for combining at least a first and second image frame based on the content of the frames and combining these frames in a transformed domain based on a determined alignment to form a composite image. This method employs common features of interest in each image and uses these to determine the horizontal and vertical alignment between the two images. The combining of the images may be partly performed in the image domain where residual shifts are performed and partly in the transform domain where block shills may be performed.

Another method of producing a panoramic image within a camera or camera-phone is described in U.S. 20090021576 to Linder et al. (Samsung) (see also U.S.20090022422). This method uses a video stream, which can be acquired in many state-of-art cameras, as the basis for constructing a panorama image. It first acquires a plurality of video frames, followed by the selection of an initial frame from the image/video sequence. The method also allows for acquiring additional still images to compliment the original video sequence. The additional video and still images may be stitched with the original image and overlay alignment and/or motion detection may be used to enhance the stitching process. The method appears to rely on directing the user of the camera or camera-phone to move the device to acquire additional images. Note that this US published patent application also includes a very detailed review of relevant literature.

Another approach is described in U.S. 20060268130 which describes a method of generating in "real-time" a panorama image from a sequence of relatively low-resolution images of a scene, displaying the panorama image for user approval, while simultaneously processing a corresponding sequence of higher resolution images so that a high-resolution panorama image is available for storing once the user has approved the low resolution version. Note that this technique is similar to U.S. 20090021576 in that it enables user modification and/or recapturing or adding images under user control. Both applications present considerable details of user interfaces.

State-of-art imaging devices are currently capable of capturing 720p and higher HD video at frame rates of 60 fps and still images of dimension 3000×2000 pixels. The processing requirements of such larger images, and increased accuracy involved with aligning the images to prevent unsightly "seams" form appearing in a panorama image present new challenges for panorama image creation, particularly if it is desired to reliably create acceptable images without user intervention' and in "real-time".

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE EMBODIMENTS

Figure 1:
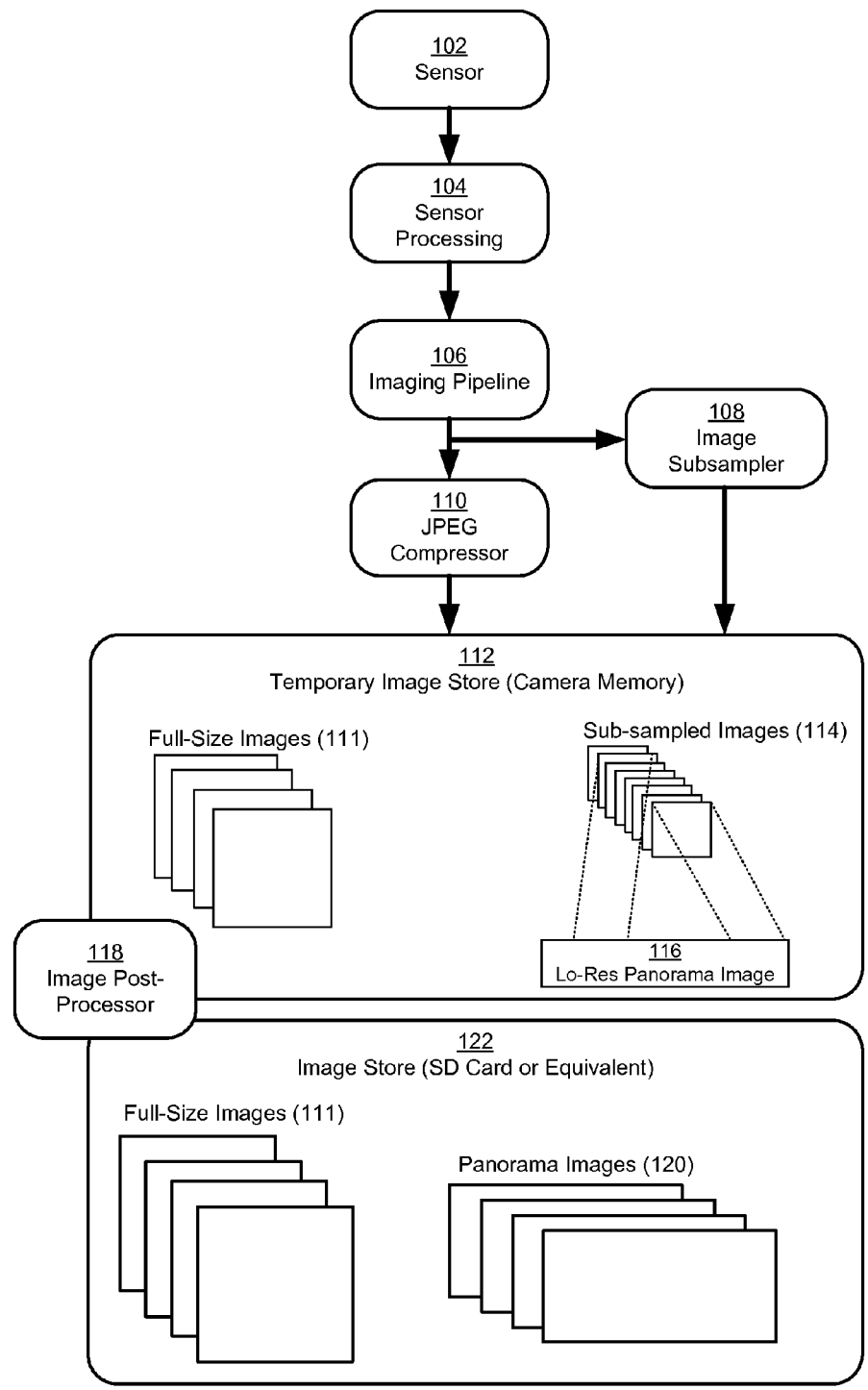
FIG. 1 illustrates features of a digital imaging device configured to generate full resolution main images and sub-sampled or resized images from a main image acquisition and processing chain in accordance with certain embodiments.

Methods of acquiring a panorama image using a portable imaging device are provided herein. In one method, an exposure level is fixed for acquiring the panorama image with the portable imaging device. The imaging device is panned across a panoramic scene. At least two relatively low-resolution image frames of overlapping portions of the panoramic scene are acquired and processed. The processing includes sorting and retaining a set of relatively low resolution image frames. A relative displacement between each image of the set of relatively low resolution image frames is determined. An approximately optimal stitch line is also determined between each pair of images of the relatively low resolution image frames. The method also includes acquiring and storing a set of main image frames corresponding to the set of relatively low resolution image frames. The main image frames are registered or aligning, or both, based on relative displacements of corresponding images of the set of relatively low resolution images. One or more approximately optimal stitch lines determined for lo-res image pairs is/are mapped onto one or more corresponding pairs of registered and/or aligned main image frames that are joined to form a main panorama image.

The determining of an approximately optimal stitch line may include determining an alpha blending map in the vicinity of the approximately optimal stitch line. The mapping of the approximately optimal stitch line onto the high resolution images may include further mapping the blending map, wherein the joining of the high resolution images includes blending the images based on the mapping of the alpha blending map. The joining may include blending the set of main image frames, including mapping the alpha-blending map for a series of the relatively low resolution image frames to a main series of image frames.

One or more of the component image frames that are joined to form the panorama image may be cropped. A set of two, three or more low resolution image frames may be acquired of component portions of the scene. A user may be notified and/or an image discarded when a horizontal overlap between consecutive images falls outside a predetermined range.

The method may also include performing sub-pixel image registration on the relatively low resolution images to prevent pixel offsets in the mapping of the alpha-blending map for the relatively low resolution series to the main series. The joining of pairs of digital images of the main series may be interleaved with the sub-pixel registration of relatively low resolution images and/or with the acquiring and/or generating, and/or joining of corresponding pairs of relatively low resolution images.

A further method of generating a panorama image using a portable imaging device includes fixing an exposure level for acquiring the panorama image using the portable imaging device, and panning the imaging device across a panoramic scene. A set of at least two image frames of overlapping portions of said panorama image are acquired and processed using an optic and imaging sensor of the portable imaging device. The processing includes sorting and retaining a set of image frames including one or more overlapping pairs of image frames. A relative displacement is determined between each of the set of overlapping image frames, including determining an overlapped region for each image pair. The images of the set are registered and/or aligned based on the relative displacements. An alpha blending map and/or an optimal stitch line is/are determined for each pair of overlapping image frames. The one or more pairs of image frames are joined to form a panorama image that is stored, transmitted and/or displaying.

The determining of relative displacement may include determining relative horizontal displacement between a pair of images of a set of overlapping image frames. Pixel values in image columns may be summed across each of first and second images to determine a horizontal image profile for each image. A column difference profile may be determined across each of images. A relative error function may be determined between the pair of images according to image column difference profiles. A minimum of the relative error function indicates a relative number of pixel columns of horizontal displacement between the pair of images.

The determining of relative displacement may further include determining relative vertical displacement between the pair of images of the set of overlapping image frames. Pixel values in image rows may be summed across each of the first and second images to determine a vertical image profile for each image. A row difference profile may be determined across each of the images. A relative error function may be determined between the pair of images according to image row difference profiles. A minimum of the relative error function indicates a relative number of pixel rows of vertical displacement are between the pair of images.

A smoothing function may be applied to the column and/or row difference profiles of each image prior to calculating the relative error function between the pair of images.

The joining is performed using the alpha blending map or the optimal stitch line, or both.

The joining may be based on determining both the approximately optimal stitch line and the alpha blending map. The approximately optimal stitch line may include an approximately 50% blending ratio between overlapped pixels of the pair of images, and the map may provide a blending ratio for overlapped pixels from the pair of images in the vicinity of the approximately optimal stitch line.

The method may also include interleaving joining of pairs of image frames with acquiring and/or generating of next image frames. The panorama image may also be cropped to a uniform vertical height.

A super-resolution method is provided for generating a panorama image using a portable imaging device including an optic, image sensor and processor. An exposure level is fixed for acquiring the panorama image with the portable imaging device. The imaging device is panned across a panoramic scene. Two or more sets of images are acquired are processed, each including at least two image frames of portions of the panoramic scene. The method includes sorting and retaining multiple images of the two or more sets. A relative displacement is determined between each pair of neighboring frames within each of the two or more sets of image frames. The method also includes registering images within each of the image sets relative to one another. Each of said two or more sets is joined to form two or more substantially overlapping panorama images. These are combined to form a higher resolution panorama image of substantially the same scene, which is storied, transmitted and/or displayed.

The combining of the two or more substantially overlapping panorama images may include applying a super-resolution technique. The cropping of the higher resolution panorama image may include removing one or more non-overlapping regions from one or more component panorama images.

The method may also include determining a relative displacement between a first or otherwise corresponding acquired frame of each of the two or more sets of image frames. A combined panoramic image derived from images of each of the two or more sets may be registered.

The method may include interleaving joining of pairs of image frames with acquiring and/or generating of next image frames.

Another method of generating a panorama image is provided, including panning across a scene a processor-based device configured for acquiring digital images. During the panning, multiple main series images are acquired with the device. Each of the multiple images contains a different angular range of the panorama scene. Also during the panning, relatively low resolution images are acquired corresponding to the multiple main series images and/or the main series images is subsampled to produce the relatively low resolution images. The relatively low resolution images are joined to form a low-res panorama, which is displayed. The multiple main series images are composited in real-time on the device based on the joining of the relatively low resolution images to form a main series panorama image.

The joining may include stitching and/or matching exposure, color balance, or luminance, or combinations thereof, aligning and/or registering edge regions of images, and blending matched, aligned images. The blending may include blurring a seam line generated between adjacent component images of the panorama image.

An exposure level may be fixed for acquiring the panorama image with the portable imaging device. The joining may include aligning and/or registering edge regions of images, and blending matched, aligned images. The blending may include blurring a seam line generated between adjacent component images of the panorama image.

The compositing may include estimating a global motion of the panning and determining whether the global motion is sufficient.

The compositing may include estimating a relative scene displacement and determining whether the relative scene displacement is sufficient. The method may include notifying a user, discarding one or more of the images and/or interrupting the method, when the relative scene displacement is determined to be insufficient. The relative scene displacement may be determined to be sufficient when frame to frame overlap comprises a range between 10% and 40%, or between 20% and 30%, or insufficient if outside a predetermined range such as 10-40%, 20-30%, or otherwise. The estimating relative displacement may include multi-dimensional motion estimating for multiple image pairs.

The method may be performed with or without user intervention, and with or without device motion measurement. The panorama image may be compressed prior to storing.

The joining of the relatively low resolution images may include generating an alpha blending map, and the alpha blending map may be used in the joining of the main series images.

A further method is provided for generating a panorama image. The method involves using a processor-based image acquisition device configured both for acquiring a main series of digital images of a panoramic scene and generating and/or acquiring a series of relatively low resolution images corresponding to the main series. The device is panned across a panoramic scene. During the panning, the main series of digital images is acquired with the device. Each of the main series of digital images contains a different angular range of the panoramic scene. The series of relatively low resolution images corresponding substantially to the same panoramic scene as the digital images of the main series are acquired and/or generated. Images of the series of relatively low resolution images are joined to form a relatively low resolution panoramic image. A map of the joining of the series of relatively low resolution images is generated. The main series of digital images is joined based on the map to form a main panoramic image, which is displayed, stored, further processed and/or transmitted.

The method may further include estimating a relative scene displacement during the panning. Portions of the panoramic scene may be selectively captured during the panning based at least in part on the estimating of the relative scene displacement. The method may include notifying the user, discarding one or more of the images and/or interrupting the method, when the relative scene displacement is determined to be insufficient, e.g., when frame to frame overlap is determined to be outside of a range between 10% and 40%, or 20% and 30%, or other set or selected range.

The estimating relative scene displacement may involve multi-dimensional displacement estimating for multiple image pairs. Horizontal (long panorama image dimension) and vertical offsets may be determined between consecutive images in the series based on the estimating of the relative scene displacement. An image of the series may be discarded if it has less than a threshold horizontal offset from a previous image of the series. The user may be notified when the panning of the device does not exceed a threshold motion. The user may also be notified, and/or an image of the series may be discarded, when a vertical offset exceeds a threshold offset with another image of the series.

The joining of main series and relatively low resolution images may include stitching. The stitching may involve aligning and/or registering edge regions of images, and blending matched, aligned images. An exposure level may be first for acquiring the panorama image with the portable imaging device, and/or the joining may involve matching exposure, color balance, and/or luminance. The blending may include blurring a seam line generated between adjacent component images of the panorama image.

The map may comprise an alpha-blending map including information of approximately optimal stitching seams determined from the joining of the relatively low resolution images. The joining of the main series may include mapping of the alpha-blending map for the low resolution series to the main series. The method may involve sub-pixel image registration of the relatively low resolution images to prevent pixel offsets from occurring during the mapping of the alpha-blending map for the low resolution series to the main series. The joining of the series of relatively low resolution images and/or of the main series may be based in part on the estimating of the relative scene displacement.

A portable camera-enabled device capable of in-camera generation of a panorama image is also provided, including a lens, an image sensor, a processor, and a processor readable medium having code embedded therein for programming the processor to perform any of the panorama image generation methods described herein.

Processor-readable storage media are also provided that have code embedded therein for programming a processor to perform any of the panorama image generation methods described herein.

A method is presented of generating a high resolution panorama image within a digital imaging device which can capture either HD video or high resolution still images. The method is performed without user intervention and without a requirement for external measurement of motion of the imaging device. Further the method is performed in "real-time" and with consideration for the limited memory resources on such devices which can generally store small numbers of high resolution video frames or still images at a time.

The method involves the user panning the device at a natural speed across a scene of which it is desired to capture a panoramic image. The device displays the scene as the user pans across it, in the same way that it would when capturing a normal video sequence.

The method involves the capture or generation of a lower resolution sequence of images than the main high-resolution video or still images. A camera-enabled device may incorporate hardware which generates a "preview stream", a sequence of low resolution images which is typically used to provide a real-time display of the data captured by the imaging sensor. Where such a preview stream is not available a device may still have an "image subsampling unit" which can generate, almost instantly, a lower resolution version of the full image or video frame.

FIG. 1 illustrates a digital imaging device configured to capture full resolution main images and to generate subsampled (resized) images from the main image acquisition and processing chain. A sensor 102 captures a full-res image, and the image data is applied to sensor processing 104 and an imaging pipeline 106. An image subsampler 108 generates subsampled images from the full-res image data, e.g., by selecting only a fraction 1/n of the overall pixels in the full-res image data, or otherwise providing a subsampled image, e.g., wherein each pixel of the subsampled image represents n pixels of the hi-res image. The hi-res images may be JPEG compressed at 110. The compressed, full-size images 111 may be stored in a memory 112, which may be a temporary image store 112, along with the subsampled images 114. A lo-res panorama image 116 may be generated, and stored temporarily in the image store 112, by joining two or more of the subsampled images 114. The low-res panorama image 116 may or may not be displayed. An image post-processor 118 generates a hi-res panorama image 120 based on information gathered in the generation of the lo-res panorama image 116, thereby advantageously saving computing resources. The hi-res panorama image 120 may be stored in an image store 122, such as a SD card or equivalent, along with the full-size images 111.

The low-resolution images (or lo-res images) may be processed in accordance with another embodiment as follows. Firstly, an initial lo-res image or video frame may be obtained and used as a first reference frame. The corresponding hi-res image is stored. Next, additional lo-res images may in certain embodiments be obtained, and an optional method of global motion estimation, e.g., such as that described at U.S. published patent application 2008/0309769, hereby incorporated by reference, may be applied between the reference frame and each additional image frame to determine their horizontal and vertical offsets. If the horizontal offset is less than a predetermined range, then the lo-res frame may be discarded along with the corresponding hi-res image. In certain embodiments (e.g. still camera), the acquisition of the corresponding hi-res image may not yet be completed. In such cases, hi-res image capture may simply be aborted and a new acquisition may be initiated.

Where a sufficient horizontal motion is not achieved within a certain timeframe, the process may be halted and/or an error message may be displayed, e.g., such as "camera not panned by user." Alternatively, a warning beep may indicate to the user to pan faster. Where the vertical offset exceeds a predetermined threshold, an error indication may be provided to warn the user that they are "drifting." In certain embodiments, no user direction is involved, while the user pans the device across a scene at a reasonable speed in the panorama process.

Once a predetermined horizontal offset has been achieved, e.g., the frame-to-frame overlap may be set, for example between 10-30% and 20-40%, or between 20% and 30% in one embodiment, then that frame is retained and the corresponding hi-res image is stored. This retained frame becomes the next reference image and the process is repeated.

After a sufficient number of overlapping frames have been determined based either on a user selection, a predefined limitation, or due to a limitation of the device memory, the acquisition process is halted. The low-res images are next "joined" using a method which is particularly effective for low-resource embedded devices. The resulting low resolution image is then cropped and may optionally be displayed for user acceptance.

At the end of the joining process of the lo-res images to form a lo-res panorama, an alpha-blending map may be created for the joining of the overlapping regions between adjacent pairs of low-res or reference image frames in the panorama. This same map may then be advantageously used to join corresponding hi-res images to create a hi-res panorama image. The use of this alpha-blending map means that joining algorithms do not have to be repeated for the hi-res images, which would otherwise be resource intensive, because an "optimal seam" between each image pair has advantageously already been determined from the joining of the lo-res images.

A method of performing sub-pixel image registration on lo-res images is also provided in certain embodiments to ensure that pixel offsets do not occur when mapping the alpha-blending map from low-res to hi-res image pairs. The hi-res panorama image is then compressed to PEG and stored.

In certain embodiments the joining of low-res pairs may be interleaved with the acquisition of new lo-res image frames. In other embodiments, where sufficient hardware support is provided within the image acquisition chain, the joining and PEG compression of portions of the hi-res images may also be interleaved with the acquisition, registration and joining of lo-res images.

Image Stitching

Image stitching, as applied to the generation of a panorama image in accordance with certain embodiments, may involve any or all of the following steps:
1. Image calibration, including perspective correction, vignetting correction, and/or chromatic aberration correction, wherein images may be processed in this optional stage to improve results.
2. Image registration, including analysis for translation, rotation, and/or focal length, wherein direct or feature-based image alignment methods may be used. Direct alignment methods may search for image orientations that minimize the sum of absolute differences between overlapping pixels. Feature-based methods determine proper image orientations by identifying features that appear in multiple images and overlapping them.
3. Image blending, or otherwise combining the sections, may involve any or all of: color correction, including matching adjoining areas of component images for color, contrast and/or brightness to avoid visibility of the seams; dynamic range extension; and/or motion compensation, deghosting, and/or deblurring to compensate for moving objects.

Techniques in accordance with certain embodiments do not involve step 1, and instead fix the camera exposure prior to acquiring an image sequence which will be processed into a panorama image. In addition, image registration may involve, in certain embodiments, determining relative displacement of images based on global image analysis of image rows and columns, rather than on localized pixel-by-pixel analysis which may involve a calculation to be taken for pixels of each adjacent image.

In step 3, color correction and/or analysis of local contrast and/or brightness levels may be eliminated in embodiments involving determining an alpha blending map and/or an image seam in a single operation.

Advantageously, techniques in accordance with certain embodiments may be performed without certain otherwise standard steps used in conventional image stitching algorithms, and/or while simplifying certain steps to provide a method particularly suited to implementation in an embedded computing system that may have relatively low system memory and/or computational resources. As such, a "stitching" technique in accordance with certain embodiments may be referred to as "joining," because it differs so greatly from conventional stitching algorithms.

Automatic Panorama Imaging

To create an automatic panorama image that requires little or no input from the user, the following may be employed in accordance with certain embodiments. First, in order to ensure that all acquired images can be combined without need for significant inter-frame color or tone adjustments, an exposure level is fixed on the imaging device prior to acquisition of the main set of images to be processed. The level may simply be fixed at a level suitable for acquisition of the initial frame of the panorama sequence. In other embodiments, the user may be allowed to manually increase or reduce the exposure level. In an alternative embodiment, the user may be prompted to perform a prescan of the panorama scene so that an average exposure level across the entire scene may be determined. This "prescan" may involve sweeping the camera-phone across the panorama scene prior to the main acquisition sweep.

A second phase of panorama creation in accordance with certain embodiments involves the user sweeping or panning the device at a natural speed across a scene of which it is desired to capture a panoramic image. The device may optionally display the scene in real-time as the user pans across it, in the same way that it would when capturing a normal video sequence or when composing a still image. At the end of this sweeping or panning, the acquisition process may terminate in any of a number of ways: by detecting that there is (i) no change (or change below a threshold) between following image frames (user holds camera in a fixed position); (ii) no similarity (or similarity below a threshold) between following image frames (user very rapidly moves camera to a different field of view); (iii) a sudden motion of the camera (for cameras equipped with motion sensor); (iv) a switch depressed or a "dead-man" switch released; (v) elapse of a time interval; (vi) a threshold number of main image frames acquired or saturation of the memory capacity of the device or various combinations of the above events.

While the camera-phone is acquiring images during the panorama sweep, it may be constantly processing these images so that a full panorama image may be acquired in real time. During this processing, many of the acquired images may be discarded in a sorting process in accordance with certain embodiments, while those which are relevant to the final panorama are retained. Furthermore these images may be registered in real time. A blending operation may be performed on the registered images.

In certain embodiments, the sorting, registration and initial blending may be performed on subsampled versions of the main acquired images or video frames.

The sorting process may enable corresponding main image frames to be retained or immediately discarded so that a small number of full sized images are stored during the panorama sweep.

The registration and blending process may enable an optimal "seam line" between lo-res images to be determined as images are acquired. As soon as the panoramic sweep is terminated, retained full-res images may be joined together without any delay using the registration and optimal seam information from the corresponding lo-res or preview images.

The resulting hi-res panorama image may then be compressed to PEG format and stored.

In certain embodiments, the joining of low-res pairs is interleaved with the acquisition of new lo-res image frames.

In other embodiments, where sufficient hardware support is provided within the image acquisition chain, one or more segments of the joining and/or JPEG compression of portions of the hi-res images may also be interleaved with the acquisition, sorting, registration and/or blending of lo-res images.

Image Registration

In certain embodiments, x & y pixel displacements are determined of one image frame relative to the next. This displacement information can then be used to select the image frames that will be used in the creation of a panorama image. In this context, U.S.20060171464 and U.S.20080309769 are incorporated by reference. Methods of video stabilization are described using image-processing techniques. Techniques in accordance with certain embodiments involve estimating inter-frame horizontal and vertical displacements of one or more pairs (or a sequence) of image frames.

This image frame displacement information can be used to select an image frame which will overlap the previous image frame by a desired number of pixels. In certain embodiments, it may alternatively be used to direct the camera to acquire (or complete acquisition of) a new full-resolution image.

A more in depth description of the inter-frame displacement measurement is presented below. In this description a second image frame (image 2) is compared with a first image frame (image 1) to determine the inter-frame X, Y displacements.

To measure the displacement in the x-direction (horizontally), columns in image 1 and image 2 are summed, the process of which is explained as follows.

Profiles of images 1&2 are summed and then smoothed using a running average kernel of length 15 in an exemplary embodiment. The length may be variable, e.g., such that the length can be increased to further smooth profiles. The image pixels values are summed along columns and the sums from the columns form a vector that may be referred to herein as a profile in accordance with this exemplary embodiment. For the sake of simplicity, only G channel is used in case of ROB image and Y channel in case of YUV image. Any colour channel containing enough information about image details can be used in that case. The profiles from both registered images are smoothed and differentiated using a convolution kernel of length adapted to the image size and amount of noise. Length is variable is certain embodiments, and can be increased or decreased.

This has the effect of filtering out small features and noise. In such a way the motion estimation is based on strong edges in the movie sequence. This also means that the estimation of X, Y displacement is more robust to variance in exposure. This estimation approach works extremely well for a wide range of image scenes, varying in exposure levels, noise level and resolution.

Horizontal (X) displacement estimation sums all the columns and vertical (Y) displacement estimation sums along the rows of the image. Thereafter the process of motion estimation is the same therefore only details for horizontal displacement are outlined below. Initially all of the columns of each row are summed for image 1 and 2. This is to create image profiles from the displacement estimation.

```
% Sum Images
    hor1 = sum(im1);    %Sum images along columns to create horizontal
                         profiles
    hor2 = sum(im2);
```

Figure 2:
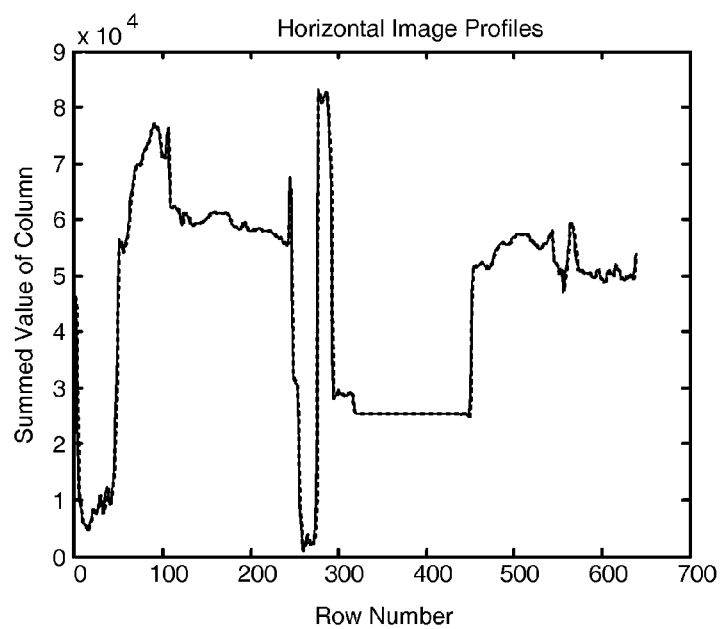
FIG. 2 shows example plots of horizontal image profiles for two image frames, including plotting the sums of columns for each row for each of the two image frames, wherein the plots shown are substantially overlapped.

The process above in MATLAB is equivalent to the equation below, $$hor1 = y = 1 y = nim1(x,y)$$

where n is the number of rows. This generates a plot as shown below in FIG. 2 of horizontal image profiles as summed values of columns versus row numbers. FIG. 2 illustrates image profiles when columns are summed and after differences are calculated.

The next step is to differentiate and smooth the profiles. This has the effect of making the displacement estimation invariant to intensity differences between the images.

```
Profile Differences
    hor1=diff(hor1);    %Take differences along profiles for im1 & im2
    hor2=diff(hor2);
``` which is equivalent to the equation below, $$hor1i = xi - xi+1 \text{ for } i=1:m-1,$$

where, m is the number of rows.

Figure 3:
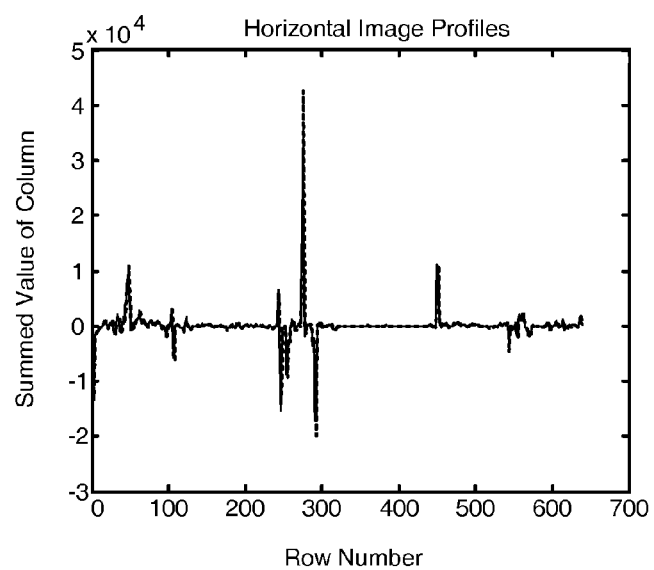
FIG. 3 shows example plots of the profiles of FIG. 2 after calculating differences along the profiles, wherein again the plots shown are substantially overlapped.

FIG. 3 illustrates image profiles after differences are calculated. FIG. 3 shows plots of horizontal image profiles as summed values of columns versus row numbers.

The profiles are then smoothed to reduce the effects of noise with the following MATLAB code. In MATLAB a convolution function is used which is equivalent to a running average filter is shown below,

```
xi=xii-15ixi
% Smooth Profiles with kernel of length 15 -note, this length is variable
% depending on noise/smoothness of profile
        kernel=15;                      %Set length of running average kernel
    avg=ones(1,kernel)./kernel;         %Running average kernel
    hor1 = conv(hor1,avg);              %Smooth profiles using running average kernel
    hor1 = hor1(kernel/2:end-kernel/2); %Crop profile ends created by kernel
    hor2 = conv(hor2,avg);
    hor2 = hor2(kernel/2:end-kernel/2);
    w1=length(hor1);                    %Length of horizontal profiles
    herr=zeros(1,2*radius+1);           %Initalise herr to calc meanSq error of
horizontal profile
```

Then one image profile is shifted relative to the other in 1 pixel shifts. At each shift the sum of the absolute differences is calculated to find the shift that minimises the differences.

$$herr(i+\text{radius}+1-imx)=\text{sum}(abs(hor1-hor2))/w1;$$

which is equivalent to the equation below, $$herri=i-30i+30hor1-hor2(i)w1$$

The result of the operation above is a plot of the error function from which we find the location of the minimum which provides the amount of frame-to-frame displacement between image 1 and image 2 in the horizontal direction. For the example in FIG. 4, the displacement measured is −1 pixel.

Figure 4:
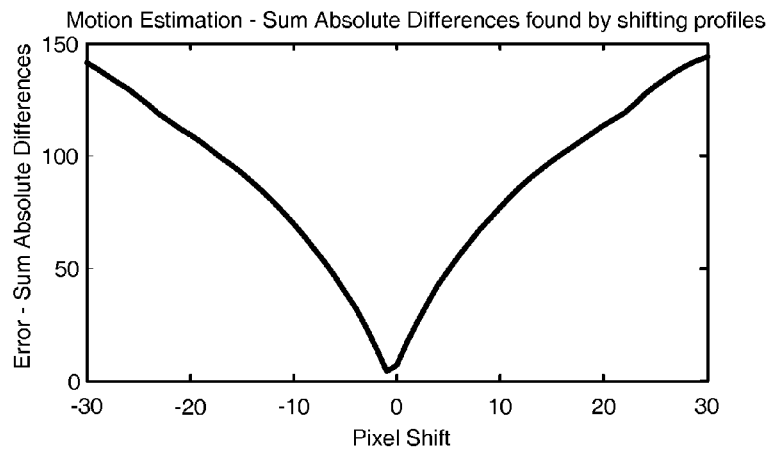
FIG. 4 shows a plot which illustrates motion estimation between the two image frames of FIGS. 2 and 3.

FIG. 4 illustrates motion estimation by plotting the sum of absolute differences found by shifting profiles versus pixel shift. FIG. 4 illustrates image profiles after differences are calculated. The position of the minimum in FIG. 4 indicates displacements between profiles.

As stated the same process is carried out for the vertical displacement estimation. Both the x and y motion estimates are calculated for the global value and for the 4 sub-regions described above. The method used to filter out errors due to subject motion within the scene is described below. In this part there are no calculations to describe just logic operations.

Figure 5:
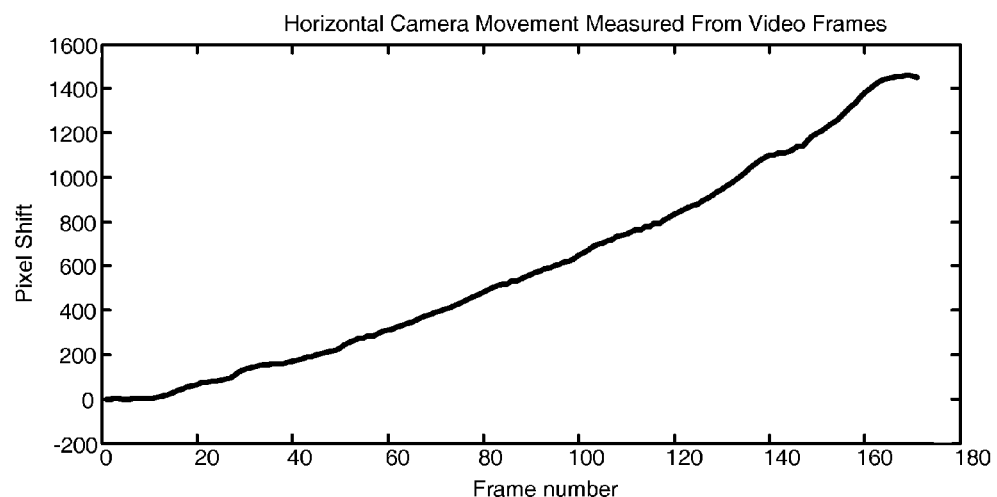
FIG. 5 shows a plot of pixel shift versus frame number for horizontal camera movement measured from video or sequential image frames.

The plot shown in FIG. 5 illustrates the cumulative x-shift in pixels along the horizontal direction with the image frame number. FIG. 5 illustrates a cumulative plot showing the total horizontal movement of the camera as pixel shift versus frame number.

Figure 6:
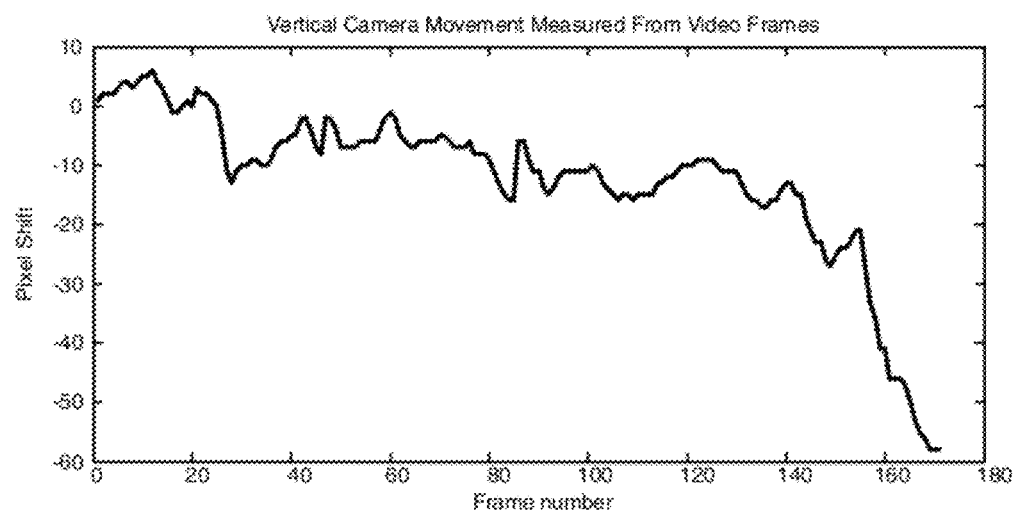
FIG. 6 shows a plot of pixel shift versus frame number for vertical camera movement measured from video or sequential image frames.

The same process is repeated for vertical displacements. An example of the vertical displacement relative to the first image frame is shown in FIG. 6. FIG. 6 illustrates a cumulative plot showing the total vertical movement of the camera as pixel shift versus frame number.

The original displacement estimation algorithm described in U.S. 20080309769 was designed to track the xy-shifts relative to the first frame, rather than from frame to frame.

To extend this displacement measuring technique to also provide a sorting mechanism for which images should be retained we retain displacement information from all earlier image frames and use these to adjust the search area for subsequent images. Thus information from frames 1 and 2 is used to adjust the search area for images 1 and 3.

This is done until the total x-shift from image 1 to image 1+n exceeds a given number of pixels. At this point image 1−n becomes a new reference frame and subsequent shifts are registered relative to it. All intermediate frames 2, 3 ... n may be dropped and only frames 1 and 1+n are retained. This process is repeated until some event terminates the panorama acquisition process.

The displacement value for the sorting process is chosen to ensure that there is a sufficient overlap between images that are to be joined together. It may be varied also to account for the lens or optical distortions on image frames. Thus where there is significant edge distortion a greater overlap may be required between image frames.

As examples, for a low distortion lens and a 480×640 lo-res video frame an overlap of 140 pixels in the horizontal direction may be adequate; for a higher distortion lens an overlap of 250+ pixels may be necessary. In the latter case the subsequent blending of images may not use the full image frames—up to 25% (150 pixels) at each end of each image may be discarded as being too distorted to be used in the blending process.

This process is repeated for the whole series of video frames. The result is that the x and y-shifts of any image frame in the sequence can be read. This then allows the selection of images to create a panoramic image. Images are chosen with a pixel shift relative to one another of, e.g. 500 pixels. Image 2 is then joined to image 1 with a pixel shift of 500 pixels in the x direction and also with the calculated y shift. This is repeated to join multiple consecutive images together.

Figure 7A:
FIG. 7A illustrates three images stitched together from sequential images taken with a camera moving substantially horizontally and slightly vertically between frames, wherein each of the three images overlaps one or two adjacent images slightly horizontally and substantially vertically.
Figure 7B:
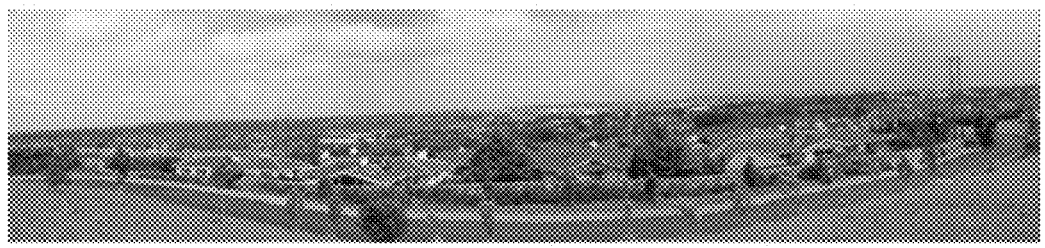
FIG. 7B illustrates a panorama image generated by cropping in the vertical direction two or more of the three images stitched together of FIG. 7A.

The image of FIGS. 7A and 7B is an example of three image frames registered with x & y displacements measured using a global motion estimation algorithm. For this panorama image the frames are selected with a horizontal displacement of 620 pixels. FIG. 7A illustrates a panorama image generated from video frames chosen by algorithm, and aligned with the calculated x & y-shifts in accordance with certain embodiments. FIG. 7B illustrates a cropped version of the panoramic image of FIG. 7A.

Image Registration with Sub-Pixel Precision

An image registration method in accordance with certain embodiments can compute horizontal and vertical displacements with at least an accuracy of one pixel. When it is desired to scale from a lo-res image to a full-res image, the algorithm is configured to prevent what would be otherwise noticeable errors across portions of the seam line apparent when conventional algorithms are used.

For example, a one pixel registration error at QVGA resolution can translate to 6 pixels error for 720p HD resolution. To deal with this problem, an image registration method in accordance with certain embodiments was extended to compute image displacements with sub-pixel accuracy, i.e., with fractional precision.

Estimation based on spline oversampling of profiles may be used for aligning images with high pixel accuracy. The base of the algorithm may be Catmull-Rom spline (cubic spline with A=−0.5). To keep a good performance level, profiles may be initially aligned to one pixel accuracy. An oversampling step may be used to find displacement in a range ±1 pixel with a predefined sub-pixel step.

A current implementation may assume a minimum step of 1/256th of a pixel. Thanks to this spline, coefficients can be pre-calculated and stored in a lookup table with 256 elements. The minimum step value may be used as a unit during sub-pixel alignment. To achieve ¼ pixel accuracy, which can be sufficient in some embodiments for most practical upscaling of the lo-res images, the step size for estimation can be set to 64.

Figure 8:
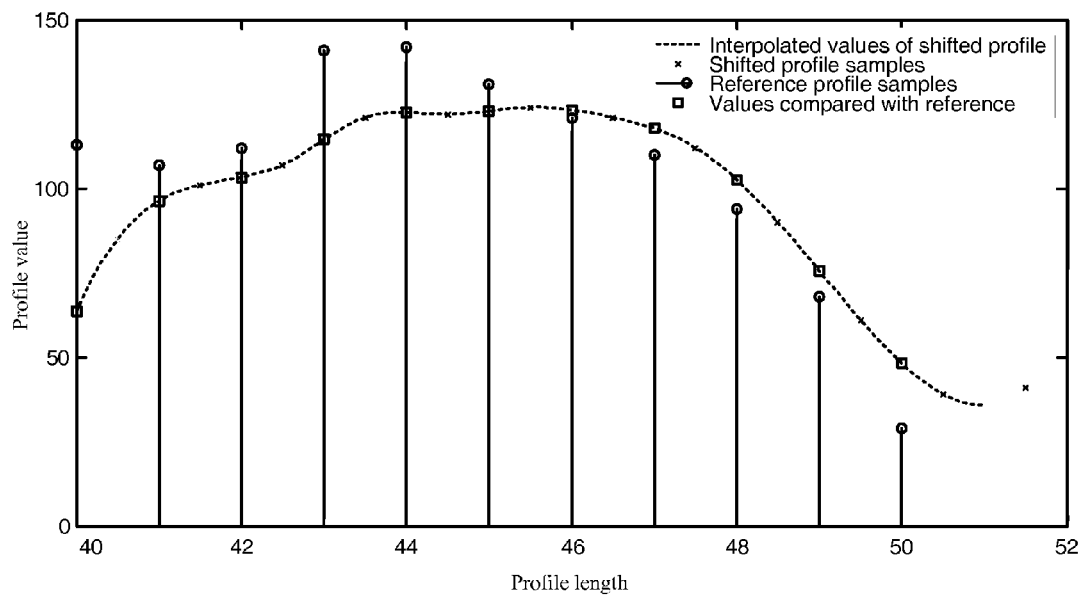
FIG. 8 is a plot that illustrates comparing a reference profile with interpolated values of a shifted profile in accordance with certain embodiments.
Figure 9:
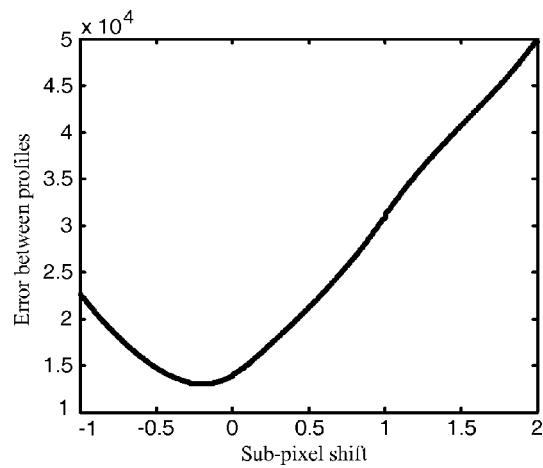
FIG. 9 is a plot illustrating changes of error between profiles in respect to sub-pixel shift in accordance with certain embodiments.

The second profile is shifted left and right with step increments and the values in-between the samples are calculated using spline interpolation. Since the shift is uniform for all the profile samples, it may involve as little as a single set of coefficients to process all the samples. One of the steps is illustrated at FIG. 8.

FIG. 1 shows a plot comparing profile 1 to interpolated values of profile 2 in an exemplary embodiment. Interpolated values are marked with squares and the reference values marked with circles are used to calculate sum of errors for given shift. The shift that produces the least sum of errors is returned in fixed point format with 8 bits fractional value. The next picture shows an example of error versus shift plot.

FIG. 2 illustrates error metric values versus sub-pixel shifts in accordance with certain embodiments. The error function is smooth within the considered range and without local minima which guarantees finding the correct fractional shift.

Panorama from HD Video-In Camera Implementation

In the case of creating a Panorama from HD video frames, the image registration process described above is too time and memory consuming to allow for a real-time, in-camera implementation. In this case, a technique in accordance with certain embodiments is illustrated in the example that follows:

1. HD frames are down-sampled to QVGA;
2. First QVGA frame is considered reference frame;
3. QVGA frames are registered with a reference frame in accordance with certain embodiments;
4. When a certain amount of overlap between frames is reached, the current frame and reference frame are joined or stitched in accordance with certain embodiments. At end of the joining process, an alpha-blending map may be created by applying a blurring kernel along the seam line;
5. The alpha-blending map may be up-sampled to HD frame resolution;
6. HD frames are blended together using the map generated at step 5;
7. Current frame becomes reference frame, steps 3-7 are repeated until a certain number of frames has been reached.

The following sections illustrate certain advantageous components of the algorithm.

Image Joining Algorithm

The goal of this algorithm is to find the best seam location between two overlapping images so that the images can be merged to create a panorama. The seam must go through the areas where the difference between those two images is the least in order not to produce visible cuts.

The general idea is to have two contours initiated at opposite sides of the overlap area that will move towards each other with a speed which is dependent on the local difference between the overlapping images. The contours propagate across the image horizontally with a certain elasticity so that certain pixels may move more quickly, although they are held back if neighbouring pixels have a lower speed. The idea is that pixels move quickly through regions where there are large differences between the overlapping images and slow down where there is a small or negligible difference between the images. In this way, the two contours which propagate horizontally towards each other meet at an approximately optimal or near-optimal seam between the two images.

Once pixels have been visited by the contour, they are assigned to the relevant image associated with the contour. Thus, the contour propagating from left-to-right will associate pixels with the left-hand image. The contour moving from right-to-left will associate pixels with the right-hand image of the overlapping image pair. The process stops where there are no more unassigned pixels in the overlap area.

Two overlapping component images are deemed to be overlapping in the horizontal direction or in the long direction of the panorama or direction of panning. So, there is a region which only belongs to the left hand (LH) image, and a region which only belongs to the right hand (RH) image. Then there is an overlapping region where pixels can be chosen from either the LH image or the RH image or some combination or calculation based thereon. Each contour starts at the LH or RH boundary of this overlapping region. The LH boundary belongs entirely to the LH image, while the technique involves moving this boundary to the right along the pixel rows of the image and at the same time moving the RH boundary to the left.

The (relative) speed with which each boundary moves is determined by the (relative) difference between the overlapping LH and RM image pixels. Where there is very little difference between a RH and LH pixel, the contour moves more slowly because this is a better place to have an image seam than a faster moving segment. Where there is a large difference, it moves quickly because a seam should not occur in a region of high differences between RH and LH image pixels. In the overlap region, a pixel can be chosen from either the LH or RH image in certain embodiments. Also note that "speed" here is relative among the segments of the contours within the overlapping region.

Now, the contour pixels in certain rows will be propagating faster than in the row above (or below), because of variations in the pixel differences. The speed at which a row propagates to the right (for LH contour) or to the left (for RH contour) is also partly constrained by its neighboring rows in certain embodiments. In these embodiments, the contour is referred to as being "elastic". Thus, where one row would be moved very quickly based on large differences between RH and LH images, it may be slowed down because the rows above (or below) are moving at a significantly slower rate, and vice-versa.

Now as the LH contour propagates to the right pixels behind (or to the left of) this propagating "boundary line" (or "state line") are taken 100% from the LH image, while similarly pixels to the right of the RH contour are taken from the RH image. Eventually these two "state lines" will begin to meet at some points and when they "collide" they simply stop propagating at the meeting points. Eventually the two contours will have met across all rows of the overlap region and a final seam line through the overlap region is determined.

Alternative embodiments may use techniques involving propagating contours in one direction (contour cannot go back) similar to those described by Sethian et.al., A Fast Marching Level Set Method for Monotonically Advancing Fronts, Proceedings from the National Academy of Sciences, submitted Oct. 20, 1995, which is incorporated by reference.

In certain embodiment, an approach similar to the Dijkstra algorithm may be utilized, for example, as set forth in Dijkstra, E. W. (1959). "A note on two problems in connexion with graphs". Numerische Mathematik 1: 269-271, http://www-m3.ma.tum.de/twiki/pub/MN0506/WebHome/dijkstra.pdf, and/or Sniedovich, M. (2006). "Dijkstra's algorithm revisited: the dynamic programming connexion" (PDF). Journal of Control and Cybernetics 35 (3): 599-620, http://matwb-n.icm.edu.pl/ksiazki/cc/cc35/cc3536.pdf, which are incorporated by reference. Contour evolution may be governed by sorting values obtained by solving differential equations. It is relatively fast algorithm on a PC, but involves repetitive sorting (at each contour update by 1 pixel), and dynamic data structures. As such, certain embodiments particularly involving embedded platforms do not use the Dijkstra approach.

Figure 10:
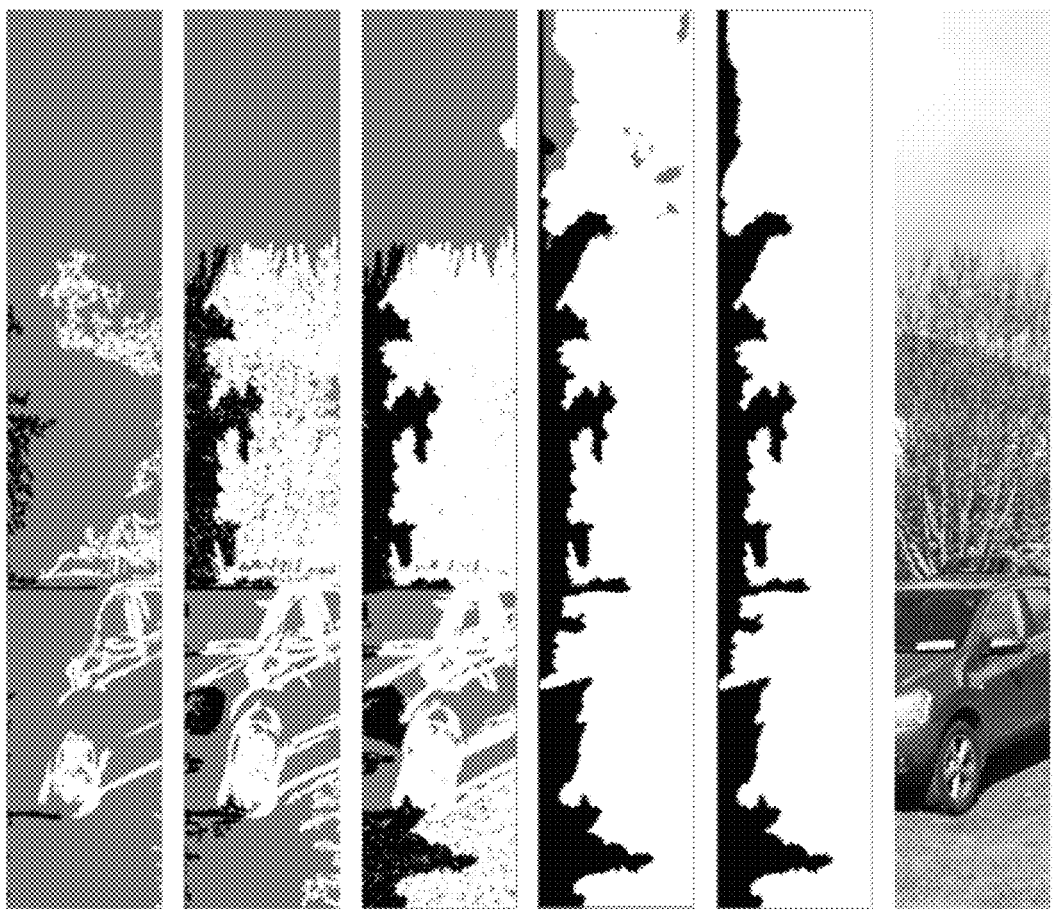
FIG. 10 illustrates an evolution of two contours propagating towards each other across an overlap area as part of a process in accordance with certain embodiments.

In certain embodiments, a FIFO queue is used to implement and realize an advantageous technique, even without memory reallocation. FIG. 10 illustrates two contours propagating towards each other across an overlap area between adjacent images to be used in a panorama.

The propagation of the contours may be controlled by a queue containing a set of 256 prioritized FIFO buckets. Bucket number 255 has a highest priority while bucket number 0 has a lowest priority. Whenever a new point of the overlap area is added to the queue, it goes to the bucket number that is equal to the weighted difference between overlapped images. The difference is in the range of 0 to 255. If a point is to be removed from the queue, it is removed from the highest priority non-empty bucket in certain embodiments. Each point added to the queue is tagged with a flag that identifies the contour the point belongs to.

An exemplary propagation algorithm may proceed as follows:
1. Initialize contours by adding points at the left and right vertical edges of the overlap area to the queue. Points at the right edge are tagged with a different label than those at the left edge;
2. Remove the first point from the queue according to rules described above;
3. Check in left, right, up, down directions if there are non-assigned points. If such points exist add them to the queue assigning them the same label as the source point had; and
4. If the queue is not empty, go to 2.

Because of noise and the presence of small details, the shape of the contour can become very intricate which means the contour has a greater length that requires a larger amount of memory to maintain the queue. To smooth out the contour shape and reduce the amount of memory required, the difference between overlapping images may be smoothed by a filter defined by the following matrix:

| 1 | 2 | 1 |
|---|---|---|
| 2 | 4 | 2 |
| 1 | 2 | 1 |

Subsequently, channel differences may be combined into one value by a weighted average:

$dI=(2\ dG+dR+dB)/4$. This filtering operation may be equivalent to a blurring of the seam line with a 3×3 blur kernel. In alternative embodiments, other blurring techniques may be used or the size of the kernel may be increased to 5×5 or other values.

Figure 11:
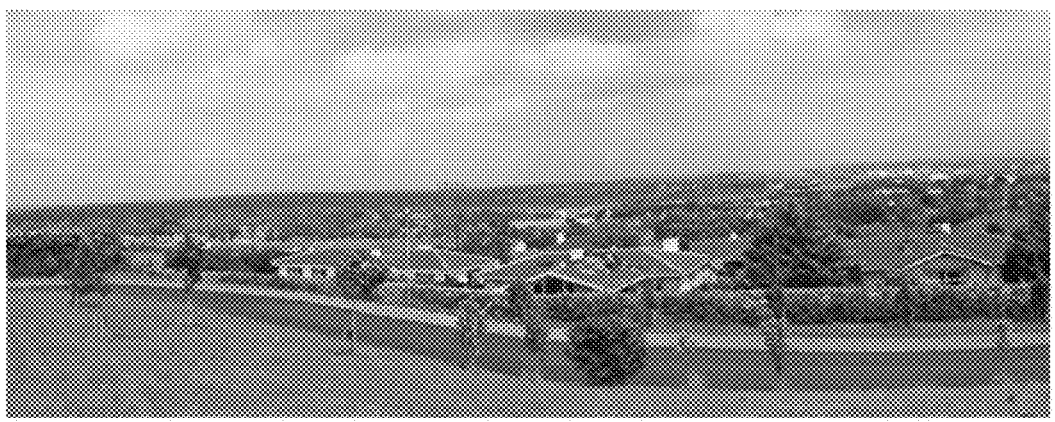
FIG. 11 shows a panoramic image generated from two images and blended by a process in accordance with certain embodiments.

An example of a full panorama created from two pictures is provided at FIG. 11. FIG. 11 illustrates a panorama created from two images and blended in accordance with certain embodiments.

To improve efficiency, the seam line can be calculated in reduced resolution using downscaled versions of overlapping areas from two images. The overlapping parts may be padded with extra pixels, for example to allow integer reduction factors. Padded parts are not taken into account in certain embodiments, and instead are each directly assigned to a proper image. In certain embodiments where the joined image is not to be upscaled, the blurring of the seam line may be omitted.

The join map size may be in certain embodiments exactly the reduced size of the image overlap area extended by padding. After calculation of the join line, the map may be enlarged by the same factor as was used for reduction.

Figure 12:
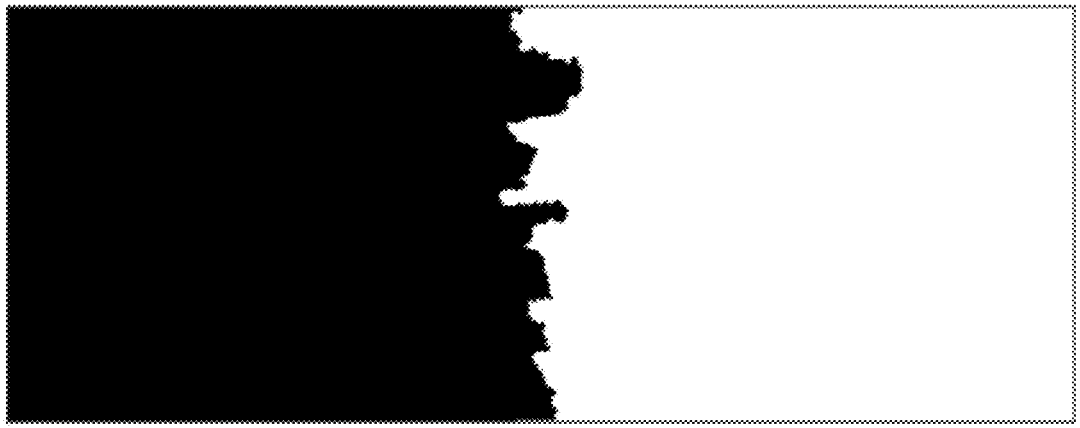
FIG. 12 illustrates a blend mask used in the generation of the panoramic image shown at FIG. 11.

In one embodiment, after the seam line is determined, a greyscale alpha blending map is created by blurring the seam line using a 3×3 Gaussian kernel. Both seam line and alpha blending maps are then up-scaled to a certain output resolution. In one embodiment, up-scaling is achieved using bilinear interpolation. This embodiment uses the alpha blending map to join the high resolution images, thereby avoiding a "boxy" seam. Thanks to the blurry transition of the blending map, the join line becomes less visible at full resolution. In certain embodiments where the joined image is not to be upscaled the blurring of the seam line may be omitted. FIG. 12 illustrates a blend mask used to create the panoramic image illustrated in FIG. 11.

The seam created with this method is invisible or hard to notice as long as the brightness of the two joined images is consistent. Variations in brightness are avoided by fixing the exposure of the imaging device prior to capturing the image set which is used to composite the final panorama image.

In certain embodiments, techniques which employ matching sharp and blurred image pairs may be employed to overcome variations in brightness across the image set. Such embodiments may employ techniques drawn from U.S.2008/0219581 or U.S. Ser. No. 12/485,316, which are incorporated by reference. For example, multiple short exposure time (SET) images, such as preview images, within a single blurred main image acquisition may be used to create multiple video frames.

In an alternative embodiment, the camera-user may be prompted to perform a pre-acquisition sweep of the panorama scene so that an optimal exposure level may be determined across the entire scene. The user then returns the camera to the original location and the exposure level is fixed based upon the pre-acquisition sweep of the scene.

In other embodiments, the exposure may be varied as each image is acquired and a detailed "delta-map" recording the relative exposure differences between images is recorded and employed to perform tone-balance and/or color matching prior to determining the optimal seam line. In some embodiments, color matching may be integrated within the imaging chain and may take adjustment data directly from the exposure "delta-map".

The placement of the seam between two images of the panorama can be easily controlled by modifying image-differences calculated between pixels of the overlap region between these two images. For example, the output of a face tracking algorithm can be used to select regions where an image seam is not desirable. Prior to the propagation of contours across the overlap region between two images, any "face regions" within this overlap region may have the image difference artificially increased to decrease the likelihood of, or completely prevent, a contour propagating algorithm from determining a seam which cuts across a face region.

A similar logic may apply to foreground portions of an image scene where image details are more perceptible to a viewer. It is less desirable in certain embodiments for an image seam to cross such a region. Thus in another alternative embodiment, outputs from a real-time face tracker or a foreground/background detector are available to the panorama algorithm and the image joining operation is modified to accommodate the outputs of the face tracker and/or foreground/background region detector. In particular, foreground regions, objects and/or detected face regions which lie in the overlap region between two images may be marked so that a seam line does not cross such regions. In a refinement of this embodiment, the seam is not completely prevented from crossing the determined region, but image differences are artificially increased to make this less likely. In a further refinement, the artificial increase in image difference is based on a depth map with a seam being progressively more likely to cross objects that are closer to a distant background of the image.

Exemplary face tracking and foreground/background techniques that may be utilized in certain embodiments are described at U.S. Pat. Nos. 7,606,417, 7,460,695, 7;469,055, 7,460,694, 7,403,643, and 7,315,631, and in U.S. published application numbers 20090273685, U.S.20060285754, U.S.20090263022, 20070269108, U.S.20090003652, and U.S.20090080713, and U.S. patent application Ser. No. 12/479,593, filed Jun. 5, 2009, and Ser. No. 12/572,930, filed Oct. 2, 2009, which are all incorporated by reference, including as disclosing alternative embodiments.

In cases where a face or foreground region, or object, extends across an entire overlap region between two images, then an error condition may be signalled and the acquisition process may be aborted. Alternatively when it is desired that the seam cross a facial area, a more sophisticated algorithm may be applied which incorporates face beautification techniques (see, e.g., U.S. patent applications Ser. Nos. 12/512,843, 12/512,819, and 12/512,716, incorporated by reference, including as disclosing alternative embodiments). Such algorithm may include texture analysis of the skin followed by subsequent feature-aware smoothing of skin regions. In other embodiments, knowledge of principle facial features, e.g., eyes, nose, mouth and hairline, combined with knowledge of an external face contour, e.g., chin and sides, may be employed.

In alternative embodiments these may be further refined by knowledge of in-plane face orientation and face pose. Such knowledge may be obtained using Active Appearance Models or rotational classifiers as described in U.S. Pat. Nos. 7,565,030 and 7,440,593, and US published application numbers U.S.20090179998, U.S.20070269108, U.S.2008/0219517, and U.S.2008/0292193, and. U.S. patent application Ser. No. 61/221,425, which are incorporated by reference including as disclosing alternative embodiments.

Foreground and Background Regions

Where foreground objects are substantially closer to the imaging device than the background scene, parallax effects may occur within the overlap region. In such cases, an error condition may be signalled. Alternatively, the foreground object(s) and background scene may be joined separately and the foreground re-composited over the background scene. In such an embodiment, information from additional images overlapping the same overlap region may be employed to facilitate an accurate joining of the foreground object and to determine an optimal positioning of the object within the joined background scene. Information from additional images may also be used to extend the imaged background, and provide details that were hidden by the foreground object due to parallax. These can be useful in advantageously determining how to join the seam for the background of the image.

In such situations additional information about the exact range/distance of foreground objects may be employed where it is available from the imaging device.

In one example embodiment, one or more foreground object(s) include one or more human faces, and possibly portions of associated body profiles (e.g., head & shoulders, or perhaps more of the torso and arms, and even legs). In this example, at least one of the faces is determined to be disposed within the panorama in an overlap region between the two image frames. Due to parallax, this foreground silhouette will appear to be displaced between the two images. If normal joining and/or stitching is applied, the silhouette would be elongated in the horizontal direction producing a "fat face" effect. In a more extreme example where the person is even closer to the imaging device, a "mirror image" of the person may be created in the final joined panorama image. To avoid these undesirable effects, foreground/background separation is applied to each of the component images, e.g., in accordance with any of U.S. Pat. Nos. 7,469,071 and 7,606,417 and U.S. published applications 2009/0273685, 2006/0285754, 2007/0147820, 2009/0040342 and 2007/0269108, which are incorporated by reference. The foreground region(s) may be cut from each of any two adjacent images to be joined and/or stitched. In one embodiment, these "cut-out" regions are filled-in using data from other image frames which overlap the same silhouette region, yet expose a different portion of the background due to a different parallax. Additional infilling and extrapolation techniques may be employed where sufficient data is not available. The background images may then be joined using the normal algorithms.

The foreground regions may also be separately aligned (e.g., for face regions by matching the locations, and optionally shapes, of facial features such as the eyes, mouth, hairline and/or chin. Following alignment, these may then be joined using the usual algorithms. Optionally, where a complete silhouette is available from each image, alternative to joining the foreground regions separately, one of the foreground regions may be selected for compositing onto an already joined background image. The location at which the foreground object is composited onto the background may be selected at a point intermediate or otherwise between the two original locations. The user may even select to position the foreground image even in a different location within the panorama, such as what may be determined to be the most scenic part of the panorama. Alternatively, the foreground location may be selected to cover points of higher contrast along the join seam for the background regions.

A wide range of face analysis techniques and methods may advantageously be employed to further enhance the appearance of such foreground silhouettes, such as those described U.S. Pat. No. 7,565,030 or U.S. published applications 2009/0179998, 2008/0013798, 2008/0292193, 2008/0175481, 2008/0266419, 2009/0196466, 2009/0244296, 2009/0190803, 2008/0205712, 2008/0219517, and 2009/0185753, and published PCT app WO2007/142621, and U.S. applications Ser. Nos. 12/512,796 and 12/374,040, which are incorporated by reference. After separating foreground facial regions, these may be enhanced by applying a variety of image processing techniques, prior to being recomposited onto the background panorama scene. The foreground/background separation and independent analyzing and processing of the foreground and background image components in accordance with these embodiments may be used to advantageously provide enhanced panorama images.

In-Camera Image Blending Process

Figure 13:
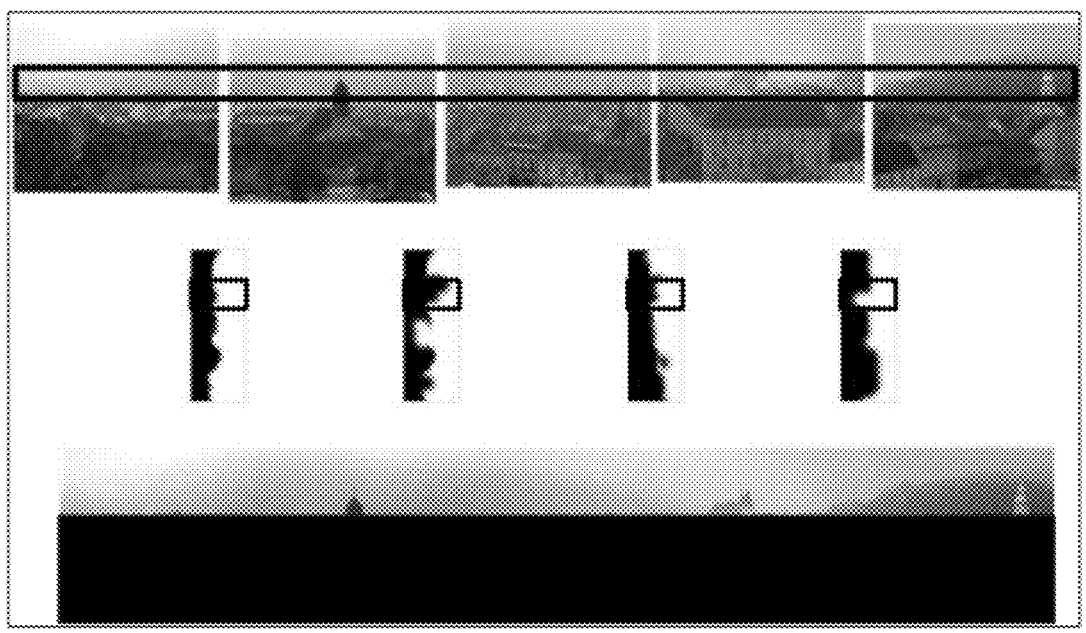
FIG. 13 illustrates an image blending process in accordance with certain embodiments.

FIG. 13 further illustrates an image blending process in accordance with certain embodiments including panoramic image generation processes. Five images are shown in FIG. 12 to be joined to form a panorama image slightly less than five times wider than any of the component images. Image blending rectangles are illustrated below where the seams will be formed when the panorama image is formed. A portion of the formed panorama image is illustrated below the image blending rectangles and component images in FIG. 13.

In an exemplary embodiment, selection of a surface can be used to indicate to a panoramic user interface which projection algorithm is to be applied. A 3D projection algorithm can be used, for example, in accordance with "Image Alignment and Stitching: A Tutorial" by Richard Szeliski (Preliminary draft, Sep. 27, 2004, Technical Report, MSR-TR-2004-92. pages 8-10; which is fully incorporated herein by reference) and/or in any of U.S. published patent applications 2006/0062487, 2006/0018547, 2005/0200706, 2005/0008254 and 2004/0130626, which are each incorporated herein by reference.

Super-Resolution: Combining of Composite Images

Another embodiment also provides a way to create a hi-res (high resolution) panorama using only lo-res (relatively low resolution) images. The term "lo-res" is meant here to be interpreted in comparison to the term "hi-res," wherein the low-res image has a lower resolution than the hi-res image, while no particular resolutions are meant. Such embodiment is suitable for lo-res (& low cost) devices. It is an approach that can be combined with camera-on-chip solutions that may compete with HD devices with superior optics & CPU power.

In this embodiment, a low-resolution panned video sequence of a panoramic scene is acquired. No high-res images are acquired and thus the seam-line is not transferred to a high-res image as in other embodiments. Also, during the sorting process, fewer image frames are discarded. Instead a larger proportion of image frames may be sorted into one of several different panorama image sets.

Thus, two or more composite panoramic images may be created by performing edge registration and joining of overlapping images. In one exemplary embodiment, image frames are joined as follows: frames 1+4+7+10 are used to form one panorama image set, then frames 2+5+8+11 form a second and 3+6+9+12 a third; these three distinct image sets are used to create three distinct panoramic images P1, P2, P3 which may be mostly, but not necessarily entirely overlapping. Note that it is not necessary to retain all images; for example there may have been additional images acquired between frames 3 and 4 (say images 3-2, 3-3 and 3-4) but these may have been discarded because there was not sufficient displacement between them, or because P1, P2 and P3 were deemed sufficient, or otherwise.

Super-resolution techniques are then applied to create a single high-resolution panoramic image. Edge registration of each panorama frame-set may be assisted using overlapping images from the other frame-sets.

Panorama Viewing Mode for Handheld Device

After a panorama image is created, it may be awkward to subsequently view the image on a handheld device. However, if information relating to the original (horizontal) motion employed during acquisition is saved with the image, then it is possible to provide an advantageous viewing mode in accordance with certain embodiments.

According to an example of such a viewing mode, the screen of a camera-phone may open with a full-height view of a central portion of the panorama image (section in brackets in the following illustration):

--[---]---------

If the camera is now panned to the left, this motion is measured and the portion of the image which is displayed is adjusted accordingly (section in brackets moved left in the following illustration compared to the previous one):

------[---]------

Or if the user swings fully around to the right (section in brackets moved right in the following illustration compared to either of the previous two):

------------[---]

Thus, it is possible to provide the entire panorama image for display in a manner which captures the nature of the original wide panoramic scene. The user can also gain the benefit of viewing different portions, segments or components of a panorama scene at full resolution in the vertical direction.

A modification of "keyhole" or "peephole" viewing is provided when the system stores data relating to the motion which was used to capture the original panorama images. This motion data may be used to control the subsequent user viewing of the image. Particularly on a handheld device, the motion may be measured during capture and during playback, although handheld motion may be simulated on a desktop computer using a mouse input, for example.

An alternative embodiment involves playing back the original video clip but controlling the direction and/or speed of playback according to how the user moves the handheld device during viewing.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

In addition, in methods that may be performed according to preferred and alternative embodiments and claims herein, the operations have been described in selected typographical sequences. However, the sequences have been selected and so ordered for typographical convenience and are not intended to imply any particular order for performing the operations, unless a particular ordering is expressly indicated as being required or is understood by those skilled in the art as being necessary.

Many references have been cited above herein, and in addition to that which is described as background, the invention summary, brief description of the drawings, the drawings and the abstract, these references are hereby incorporated by reference into the detailed description of the preferred embodiments, as disclosing alternative embodiments of elements or features of the preferred embodiments not otherwise set forth in detail above.

What is claimed is:

1. A method of generating a panorama image using a portable imaging device, said method comprising:
fixing an exposure level for acquiring the panorama image using the portable imaging device;
panning the imaging device across a panoramic scene, acquiring a set of at least two image frames of overlapping portions of said panorama image and processing said set, said acquiring comprising using an optic and imaging sensor of the portable imaging device, said processing including:

sorting and retaining a set of image frames including one or more overlapping pairs of image frames, determining a relative displacement between each of said set of overlapping image frames, including determining the overlapped region for each image pair, registering or aligning, or both, said set of images based on the relative displacements;

determining an alpha blending map or an optimal stitch line or both for each pair of overlapping image frames;

joining said one or more pairs of image frames to form a panorama image; and storing, transmitting or displaying said panorama image, or combinations thereof, wherein the determining of relative displacement comprises determining relative horizontal displacement between a pair of images of a set of overlapping image frames, and further includes summing pixel values in image columns across each of first and second images to determine a horizontal image profile for each image, and then determining a column difference profile across each of said images, and then determining a relative error function between said pair of images that is determined from said image column difference profiles, and wherein a minimum of said relative error function indicates a relative number of pixel columns of horizontal displacement are between said pair of images.

2. The method of claim 1, wherein the determining of relative displacement comprises determining relative vertical displacement between the pair of images of the set of overlapping image frames, and further comprises summing pixel values in image rows across each of first and second images to determine a vertical image profile for each image, and then determining a row difference profile across each of said images, and then determining a relative error function between said pair of images that is determined from said image row difference profiles, and wherein a minimum of said relative error function indicates a relative number of pixel rows of vertical displacement are between said pair of images.

3. The method of claim 2, further comprising applying a smoothing function to the column or row difference profile, or both, of each image prior to calculating the relative error function between the pair of images.

4. The method of claim 1, further comprising applying a smoothing function to the column difference profile of each image prior to calculating the relative error function between the pair of images.

5. The method of claim 1 where said joining is performed using said alpha blending map or said optimal stitch line, or both.

6. The method of claim 1 where said joining is based on determining both said approximately optimal stitch line and said alpha blending map, and wherein said approximately optimal stitch line comprises an approximately 50% blending ratio between overlapped pixels of the pair of images, and wherein said alpha blending map provides a blending ratio for overlapped pixels from the pair of images in the vicinity of said approximately optimal stitch line.

7. The method of claim 1, further comprising interleaving joining of pairs of image frames with acquiring or generating, or both, of next image frames.

8. The method of claim 1, further comprising cropping said panorama image to a uniform vertical height.

9. A portable camera-enabled device capable of in-camera generation of a panorama image, comprising:

a lens;

an image sensor;

a processor; and a processor readable medium having code embedded therein for programming the processor to perform a panorama image generation method that comprises:

fixing an exposure level for acquiring the panorama image using the portable device;

panning the imaging device across a panoramic scene, acquiring a set of at least two image frames of overlapping portions of said panorama image and processing said set, said acquiring comprising using an optic and imaging sensor of the portable imaging device, said processing including:

sorting and retaining a set of image frames including one or more overlapping pairs of image frames, determining a relative displacement between each of said set of overlapping image frames, including determining the overlapped region for each image pair, registering or aligning, or both, said set of images based on the relative displacements;

determining an alpha blending map or an optimal stitch line or both for each pair of overlapping image frames;

joining said one or more pairs of image frames to form a panorama image; and storing, transmitting or displaying said panorama image, or combinations thereof, wherein the determining of relative displacement comprises determining relative horizontal displacement between a pair of images of a set of overlapping image frames, and further includes summing pixel values in image columns across each of first and second images to determine a horizontal image profile for each image, and then determining a column difference profile across each of said images, and then determining a relative error function between said pair of images that is determined from said image column difference profiles, and wherein a minimum of said relative error function indicates a relative number of pixel columns of horizontal displacement are between said pair of images.

10. The device of claim 9, wherein the determining of relative displacement comprises determining relative vertical displacement between the pair of images of the set of overlapping image frames, and further comprises summing pixel values in image rows across each of first and second images to determine a vertical image profile for each image, and then determining a row difference profile across each of said images, and then determining a relative error function between said pair of images that is determined from said image row difference profiles, and wherein a minimum of said relative error function indicates a relative number of pixel rows of vertical displacement are between said pair of images.

11. The device of claim 10, wherein the method further comprises applying a smoothing function to the column or row difference profile, or both, of each image prior to calculating the relative error function between the pair of images.

12. The device of claim 9, wherein the method further comprises applying a smoothing function to the column difference profile of each image prior to calculating the relative error function between the pair of images.

13. The device of claim 9, wherein said joining is performed using said alpha blending map or said optimal stitch line, or both.

14. The device of claim 9, wherein said joining is based on determining both said approximately optimal stitch line and said alpha blending map, and wherein said approximately optimal stitch line comprises an approximately 50% blending ratio between overlapped pixels of the pair of images, and wherein said alpha blending map provides a blending ratio for overlapped pixels from the pair of images in the vicinity of said approximately optimal stitch line.

15. The device of claim 9, wherein the method further comprises interleaving joining of pairs of image frames with acquiring or generating, or both, of next image frames.

16. The device of claim 9, wherein the method further comprises cropping said panorama image to a uniform vertical height.

17. One or more non-transitory processor-readable storage media having code embedded therein for programming a processor to perform a method for acquiring a panorama image using a portable imaging device, said method comprising:
   fixing an exposure level for acquiring the panorama image using the portable imaging device;
   panning the imaging device across a panoramic scene,
   acquiring a set of at least two image frames of overlapping portions of said panorama image and processing said set, said acquiring comprising using an optic and imaging sensor of the portable imaging device, said processing including:
      sorting and retaining a set of image frames including one or more overlapping pairs of image frames,
      determining a relative displacement between each of said set of overlapping image frames, including determining the overlapped region for each image pair,
      registering or aligning, or both, said set of images based on the relative displacements;
      determining an alpha blending map or an optimal stitch line or both for each pair of overlapping image frames;
      joining said one or more pairs of image frames to form a panorama image; and
      storing, transmitting or displaying said panorama image, or combinations thereof,
   wherein the determining of relative displacement comprises determining relative horizontal displacement between a pair of images of a set of overlapping image frames, and further includes summing pixel values in image columns across each of first and second images to determine a horizontal image profile for each image, and then determining a column difference profile across each of said images, and then determining a relative error function between said pair of images that is determined from said image column difference profiles, and wherein a minimum of said relative error function indicates a relative number of pixel columns of horizontal displacement are between said pair of images.

18. The one or more non-transitory processor-readable storage media of claim 17, wherein the determining of relative displacement comprises determining relative vertical displacement between the pair of images of the set of overlapping image frames, and further comprises summing pixel values in image rows across each of first and second images to determine a vertical image profile for each image, and then determining a row difference profile across each of said images, and then determining a relative error function between said pair of images that is determined from said image row difference profiles, and wherein a minimum of said relative error function-indicates a relative number of pixel rows of vertical displacement are between said pair of images.

19. The one or more non-transitory processor-readable storage media of claim 18, wherein the method further comprises applying a smoothing function to the column or row difference profile, or both, of each image prior to calculating the relative error function between the pair of images.

20. The one or more non-transitory processor-readable storage media of claim 17, wherein the method further comprises applying a smoothing function to the column difference profile of each image prior to calculating the relative error function between the pair of images.

21. The one or more non-transitory processor-readable storage media of claim 17, wherein said joining is performed using said alpha blending map or said optimal stitch line, or both.

22. The one or more non-transitory processor-readable storage media of claim 17, wherein said joining is based on determining both said approximately optimal stitch line and said alpha blending map, and wherein said approximately optimal stitch line comprises an approximately 50% blending ratio between overlapped pixels of the pair of images, and wherein said alpha blending map provides a blending ratio for overlapped pixels from the pair of images in the vicinity of said approximately optimal stitch line.

23. The one or more non-transitory processor-readable storage media of claim 17, wherein the method further comprises interleaving joining of pairs of image frames with acquiring or generating, or both, of next image frames.

24. The one or more non-transitory processor-readable storage media of claim 17, wherein the method further comprises cropping said panorama image to a uniform vertical height.

* * * * *